United States Patent [19]

Araki et al.

[11] Patent Number: 4,807,421
[45] Date of Patent: Feb. 28, 1989

[54] EQUIPMENT FOR HANDLING VARIOUS CONTAINERS

[75] Inventors: Kazunori Araki; Masayuki Hayashi; Shogo Yamaguchi; Munehiro Hanada, all of Nagoya, Japan

[73] Assignee: Mitsubishi Jukogyo Kabushiki Kaisha, Tokyo, Japan

[21] Appl. No.: 101,202

[22] Filed: Sep. 25, 1987

Related U.S. Application Data

[62] Division of Ser. No. 879,585, Jun. 27, 1986, abandoned.

[30] Foreign Application Priority Data

Jul. 19, 1985 [JP] Japan .................. 60-159952
Jul. 19, 1985 [JP] Japan .................. 60-159961
Oct. 31, 1985 [JP] Japan .................. 60-244790

[51] Int. Cl.$^4$ .......................................... B65B 43/52
[52] U.S. Cl. .................................... 53/167; 53/282; 198/803.01; 198/803.8; 198/803.11; 198/803.15; 211/89; 269/254 R; 269/287; 294/99.1
[58] Field of Search ................. 53/167, 426, 221, 282; 198/803.01, 803.8, 803.11, 803.15; 211/74, 89; 248/314; 269/254 R, 287; 294/99.1; 422/64, 304

[56] References Cited

U.S. PATENT DOCUMENTS

| | | | |
|---|---|---|---|
| 301,719 | 7/1884 | Holmes | 248/314 |
| 1,724,336 | 8/1929 | Ayers | 198/803.15 X |
| 1,934,250 | 11/1933 | Wynne et al. | 198/803.8 |
| 2,634,737 | 4/1953 | Rowe | 198/803.8 |
| 2,932,378 | 4/1960 | Smith | 198/803.15 X |
| 2,956,687 | 10/1960 | Robichaud | 211/74 |
| 3,137,330 | 6/1964 | MacLagan | 198/803.8 |
| 3,199,552 | 8/1965 | Nordfors | 198/803.8 X |
| 3,269,090 | 8/1966 | Schmied | 53/221 |
| 3,336,722 | 8/1967 | Van Der Winden | 53/426 |
| 3,365,761 | 1/1968 | Kalvig | 211/89 X |
| 3,538,997 | 11/1970 | Christine | 198/803.01 |
| 3,575,713 | 4/1971 | Duff | 198/803.15 |
| 3,599,780 | 8/1971 | Sorbie | 198/803.11 |
| 3,603,551 | 9/1971 | Peterson | 211/89 X |
| 3,807,467 | 4/1974 | Tascher et al. | 53/282 |
| 4,200,183 | 4/1980 | Riggs | 198/803.01 |

FOREIGN PATENT DOCUMENTS

| | | | |
|---|---|---|---|
| 222294 | 7/1962 | Austria | 211/89 |
| 1014014 | 12/1965 | United Kingdom | 53/426 |

*Primary Examiner*—John Sipos
*Attorney, Agent, or Firm*—Wenderoth, Lind & Ponack

[57] ABSTRACT

A container holder capable of holding various containers, such as bottles and cans, comprises a deformable container-holding member made from a plastic material, a holding frame, and an adapter plate. The central portion of the holding member is divided into several tongues, and a central hole surrounded by these tongues is formed. The holding member is sandwiched between the adapter plate and the holding frame. Depending on the kind of the container held by this holder, the adapter plate is replaced with another adapter plate. Also disclosed is a container carrier in which container holders as described above are detachably mounted. An apparatus for handling containers using this container holder comprises mechanisms for performing these handling operations and conveying the container carrier between stations for the handling operations while the containers are received in the container holder. Equipment for warming or cooling containers received in said container carrier comprises mechanisms for repeatedly turning the carrier upside down.

10 Claims, 8 Drawing Sheets

(I) (II) (III) (IV) (V)

EQUIPMENT FOR HANDLING VARIOUS CONTAINERS

This application is a divisional of application Ser. No. 879,585, filed on June 27, 1986, now abandoned.

FIELD OF THE INVENTION

The present invention relates to a flexible container holder which can be used as a holder or gripper for casers, uncaser, rinsers, bottle-washing machines, fliers, cappers, and other similar devices, and which can also be employed as a carrier movable between these devices. The invention also relates to a container carrier in which such flexible container holders are detachably mounted. Further, the invention relates to the manner in which this container carrier is conveyed and also to a method of handling containers received in the carrier. Yet, the invention relates to an equipment for handling various containers. Additionally, the invention relates to a method of handling various containers in a container-handling plant comprising handling apparatuses, such as filling machine, bottle-washing machine, rinser, case packer, uncaser, capper, and pasteurizer, and carrying apparatuses, such as conveyors, and also to an equipment used for such a handling. Furthermore, the invention relates to a method of warming or cooling product containers in a bottle-cooling machine, bottle-warming machine, can-cooling machine, can-warming machine, in-bottle-pasteurizer, in-can-pasteurizer, or the like, and also to an equipment for warming or cooling product containers by this method.

BACKGROUND OF THE INVENTION

A flexible container holder that is used to carry and hold a container is disclosed in Japanese utility model laid-open No. 882/1977. Another flexible container holder that is used to carry a bottle washer is disclosed in Japanese utility model laid-open No. 88437/1978. However, a simple flexible container holder that is versatile, produces a sufficient gripping force, and has a self-centering function is not available.

In a bottling or canning plant, many kinds of containers are handled, i.e., conveyed, indexed, positioned, held, and gripped. Whenever a different kind of container is to be handled, dedicated tools adapted to the size and shape of the handled containers are prepared, or the tools used for the previous handling are readjusted. As more diversified containers are used, a single plant is required to handle more kinds of containers. In order to satisfy this requirement, the components of a plant, i.e., rinser filler, capper, caser, conveyor, etc. must be equipped with their respective numerous dedicated devices. Further, a long time is taken to set up the equipment.

In this way, in the conventional plant of this kind, dedicated handling devices are used for each individual kind of container. Therefore, the components of the plant need their respective many replaceable parts. Further, a long time is required to set up the components.

A conventional plant for handling containers consists of fillers, rinsers, cappers, case packers, uncasers, and other components which are connected together by conveyors in the order of operation. Containers to be handled are taken out of a bulk depalletizer. Then, they are individually cleaned, filled, and received in a packer. These containers are repeatedly combined together or separated according to the characteristics and the conditions of the components. At the entrance to each component, the containers are spaced a given distance from one another or arrayed, depending on the characteristics and the conditions of the component. The conveyors which interconnect the components of the plant are controlled to smoothly and efficiently run the whole production line. When one kind of container is switched to another, the following operations have been required to be performed according to the shape and the size of the container. (1) Adjustment of the width and height of each conveyor guide. (2) Adjustment of the width and height of the guides for each component. (3) Replacement and adjustment of the parts of each components which handle containers. (4) Setting of the velocity, capacity, etc.

These operations are effected when the production line is stopped. In the conventional container-handling plant described above, the components of the plant are interconnected by the conveyors, and the containers are separately handled. Therefore, the following various problems have arisen.

(1) The containers are repeatedly gathered and separated according to the characteristics and conditions of the components of the plant. Whenever the containers are handled, they collide with each other or with guides or are rubbed. As a result, the containers, such as bottles, are caused to scuff or break, or become damaged.

(2) The collisions or rubbings described in (1) above produce noise, deteriorating the work environment.

(3) It is necessary to arrange the containers at certain intervals or array them at the entrance to each component. Hence, the rate of operation of the whole production line decreases, leading to a reduction in the productivity.

(4) When one kind of container is switched to another, the widths and heights of guides for the conveyors interconnecting the components are required to be readjusted according to the shape and dimensions of the container. Further, it is necessary to replace or readjust the guides for the components and the parts for handling the container. Therefore, it is quite laborious to make preparations for the switching of the kind of container. Also, large space and much labor are needed to store and convey various kinds of parts. The parts used to switch one kind of container to another include container-indexing screws, star wheels, container guides, valve attachments. As the number of the kinds of containers handled increases, the number of these parts increases, thus posing problems.

(5) The containers are gathered or separated while conveyed in one or more rows. During this operation, the containers may come to a stop or fall down, resulting in a decrease in the rate of operation of the production line. Also, in order to remove the trouble, labor is necessitated. Further, in order that the containers be smoothly gathered and separated and that the components run efficiently, the line is required to be controlled in a complex manner.

(6) Since the components each having a single function are connected together by conveyors to constitute a production line, the plant occupies large space. To save the energy consumed and the space, improvements have been demanded.

(7) When one kind of container is switched to another, it is necessary to stop or halt the production line. This lowers the rate of operation of the equipment, and makes it difficult to effect a production so as to meet the diversified consumer's needs.

Pasteurizers for sterilizing products have heretofore showered the outside of each container, the contents of which are warmed or cooled by the natural convection of the contents. Accordingly, it takes a long time to sterilize the containers. This prolongs the whole production time, which is required to be improved to reduce the energy consumed and the working hours. Also, the pasteurizers of a plant occupy the largest space to install among the components of the plant. This situation must be remedied to curtail the space.

As described above, when containers of this kind is handled, they have been treated individually. Therefore, numerous problems have occurred, e.g., damage to the containers, production of noise, a reduction in the rate of operation of the production line, cumbersome with which one kind of container is switched to another, an increase in the number of preparatory steps, the necessity of various parts, the need to control the line in a complicated way, and difficulty with which the production is effected timely. Especially, a sterilizing process needs a very long time. Further, the equipment occupies large space. Among others, these undesirable situations must be remedied.

The conventional method of warming or cooling product containers, such as bottles and cans, is to spray warm or cold water on the outside of each product container while the container is put upright, so that the liquid inside the container is warmed or cooled by the natural convection of the liquid. When this conventional method is utilized, the warming or cooling depends on the natural convection of the liquid inside the product container, such as a bottle or can, and so it takes a very long time to complete the warming or cooling operation.

When a bottle or can placed still is warmed or cooled by natural convection without stirring the inside product liquid, locally and considerably heated or cooled spots are generally produced before the handling process. Especially, when the whole inside liquid is sterilized, it is necessary to uniformly heat the whole liquid. For this purpose, if local cold spots are heated to a predetermined temperature, then the other portions are overheated. This may impair the quality of the product, such as taste, color, flavor, aroma, or the like.

In this way, the conventional method of warming or cooling a product container, such as a bottle or can, is to spray warm or cold water on the outside of the container that is placed still. The resulting natural convection of the inside product liquid warms or cools the liquid. Therefore, it takes a long time to complete the warming or cooling operation. Further, locally heated or cooled spots tend to occur inside the liquid, thus sometimes degrading the quality of the product.

SUMMARY OF THE INVENTION

In view of the foregoing problems with the prior art techniques, it is an object of the present invention to provide a container holder which requires less setup operations, can be used for all the components of a production line by dispensing with the replacement or adjustment of the components by a setup operation of the first stage, and can be versatilely employed for containers of various shapes.

It is another object of the invention to provide a container carrier on which container holders designed as described in the preceding paragraph are detachably mounted.

It is a further object of the invention to provide a method of performing cleaning, filling, sealing, sterilizing, and other steps while holding containers in the container carrier designed as described above, and of conveying the containers between neighboring stations where the handling operations are performed, while holding the containers in the carrier.

It is a yet further object of the invention to provide a method of handling several containers simultaneously using a single carrier that can be employed for various handling processes, and also to provide an equipment for handling containers by this method.

It is a still other object of the invention to provide a method of warming or cooling a product container to uniformly handle the product liquid inside the container in a short time, and also to provide an equipment for effecting such a process.

In one embodiment of the invention, a flexible container holder comprises: a deformable container-holding member made from a plastic material and acting to hold a container and to place it in the center of the holder; a retainer frame that retains the holding member; and an adapter plate which is used also for another kind of container or replaced with another adapter plate, depending on the force with which the container is held by the container-holding member, the force being determined by the shape, weight, diameter, and so on of the container.

In one feature of the invention, the container-holding member is designed to be deformable along a circle. Therefore, it can readily accommodate itself to even containers of special shapes, such as square, triangle, and rectangle. The force produced by this accommodation helps center the container, and acts to retain it. Also, the retaining force and the centering function are obtained by the frictional resistance and the restoring elastic force produced by the material. The weight of the container itself which would otherwise cause it to fall is canceled by the force produced by the deformation of the flexible holding member.

In another embodiment of the invention, an equipment capable of handling various containers comprises: a container carrier in which flexible container holders are detachably mounted; apparatuses for cleaning, filling, sealing, sterilizing containers while holding them in the carrier, and conveyors for carrying the carrier between the apparatuses.

Further, the invention provides a method of warming or cooling one or more product containers, such as bottles or cans, by means of an apparatus that cools or warms bottles or cans. The apparatus can also serve either as an in-bottle-pasteurizer or as an in-can-pasteurizer. The apparatus comprises carrier conveyor paths having heating or cooling means and a path-selecting means for selecting desired one out of the paths. In at least one of the paths, a means is provided that rotates a container carrier in which flexible container holders are detachably mounted.

In a further embodiment of the invention, a method of handling various containers using a carrier in which several container holders are mounted comprises the steps of (1) cleaning, filling, and sealing the containers while the containers are received in the carrier and (2) conveying the containers between the stations where the cleaning and other steps are carried out while the containers are received in the carrier. The container holders are designed to hold and center various containers.

In a still other embodiment of the invention, an equipment for handling various containers comprises a carrier in which several container holders are held, apparatuses for respectively cleaning, filling, and sealing the containers while the containers are received in the carrier, and conveyors for interconnecting the apparatuses using the carrier, the container holders being designed to hold and center the containers.

In a yet other embodiment of the invention, a method of warming or cooling one or more product containers, such as bottles and cans, while the containers are held in a carrier comprises the steps of repeatedly turning the containers upside down and simultaneously warming or cooling them.

In a still further embodiment of the invention, an equipment for warming or cooling one or more product containers by the method described in the preceding paragraph comprises: the equipment acting as a machine for cooling or warming bottles or cans and as an in-bottle-pasteurizer or in-can-pasteurizer; carrier conveyance paths having heating or cooling means, at least one of the paths being equipped with a means for rotating the carrier; and a path-selecting means capable of selecting desired one out of the paths.

In another feature of the invention, containers, such as bottles and cans, are repeatedly turned upside down while they are received in a carrier. Thus, the product liquid inside each container is well stirred. This makes the temperature distribution within the container more homogeneous. Further, the general transfer of heat is almost doubled during the warming or cooling operation. When an in-bottle-pasteurizer is used also as a machine for cooling or warming bottles, or when an in-can-pasteurizer is employed also as a machine for cooling or warming cans, the carrier is allowed to travel a shorter distance in its path to select a shorter course, whereby the time required for the handlings can be shortened.

Other objects and features of the invention will appear in the course of the description thereof which follows.

BRIEF DESCRIPTION OF THE DRAWINGS

FIG. 7 is a view similar to FIG. 6, but in which a small container is retained;

FIG. 15 (I)–(V) are side elevations of one of the containers shown in FIG. 14, for showing the manner in which it is rotated;

DETAILED DESCRIPTION OF THE INVENTION

Figure 1:
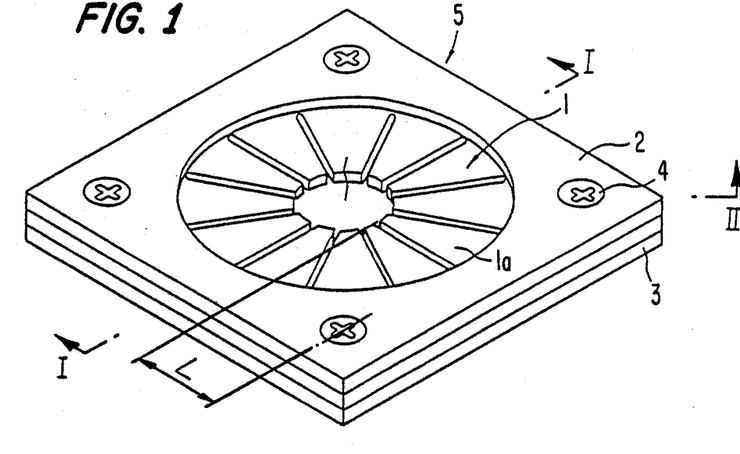
FIG. 1 is a perspective view of a flexible container holder according to the invention.
Figure 2:
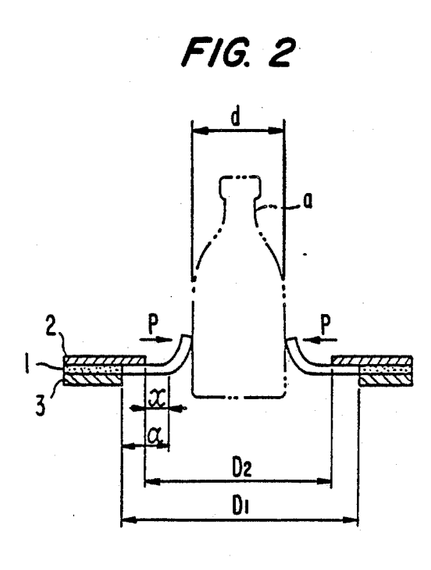
FIG. 2 is a cross-sectional view taken on line I—I of FIG. 1, for showing the condition in which a low container of a small diameter is retained.
Figure 3:
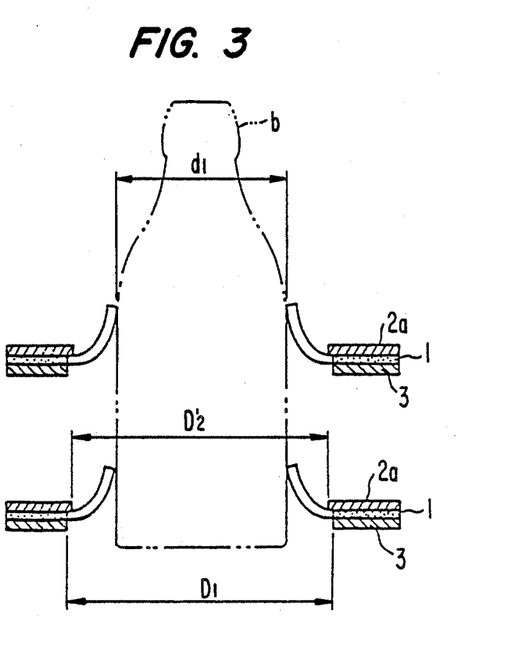
FIG. 3 is a view similar to FIG. 2, but in which a high container of a large diameter is retained.

Referring to FIGS. 1–3, there is shown a container holder according to the present invention. The holder, generally indicated by reference numeral 5, has a flexible holding member 1 for holding a container a. The holding member 1 is made from a material exhibiting a large fractional coefficient, such as synthetic resin, rubber, compound, or the like. The holding member 1 that is centrally formed with a hole $1b$ is divided into tongues $1a$ which extend radially inward. An adapter 2 which can be replaced with another adapter or can be used for some kinds of containers sets the force with which the container a is held, according to the material, size, shape, and other characteristics of the container a. The adapter 2 is made of a rectangular plate whose circular central portion has been cut off. A holding frame 3 is similar in contour to the adapter 2. The holding member 1 is sandwiched between the frame 3 and the adapter 2, and these components are coupled together using bolts 4 or the like to form the holder 5. The material, thickness, shape of the holding member 1, and the number of the tongues $1a$ can be selected at will according to the size, shape, weight, rigidity, material, and other characteristics of the container a retained by the holding member 1. Of course, the diameter of the hole $1b$ at the center is set smaller than the outside diameter d.

Figures 4, 5, 6, 8, 9:
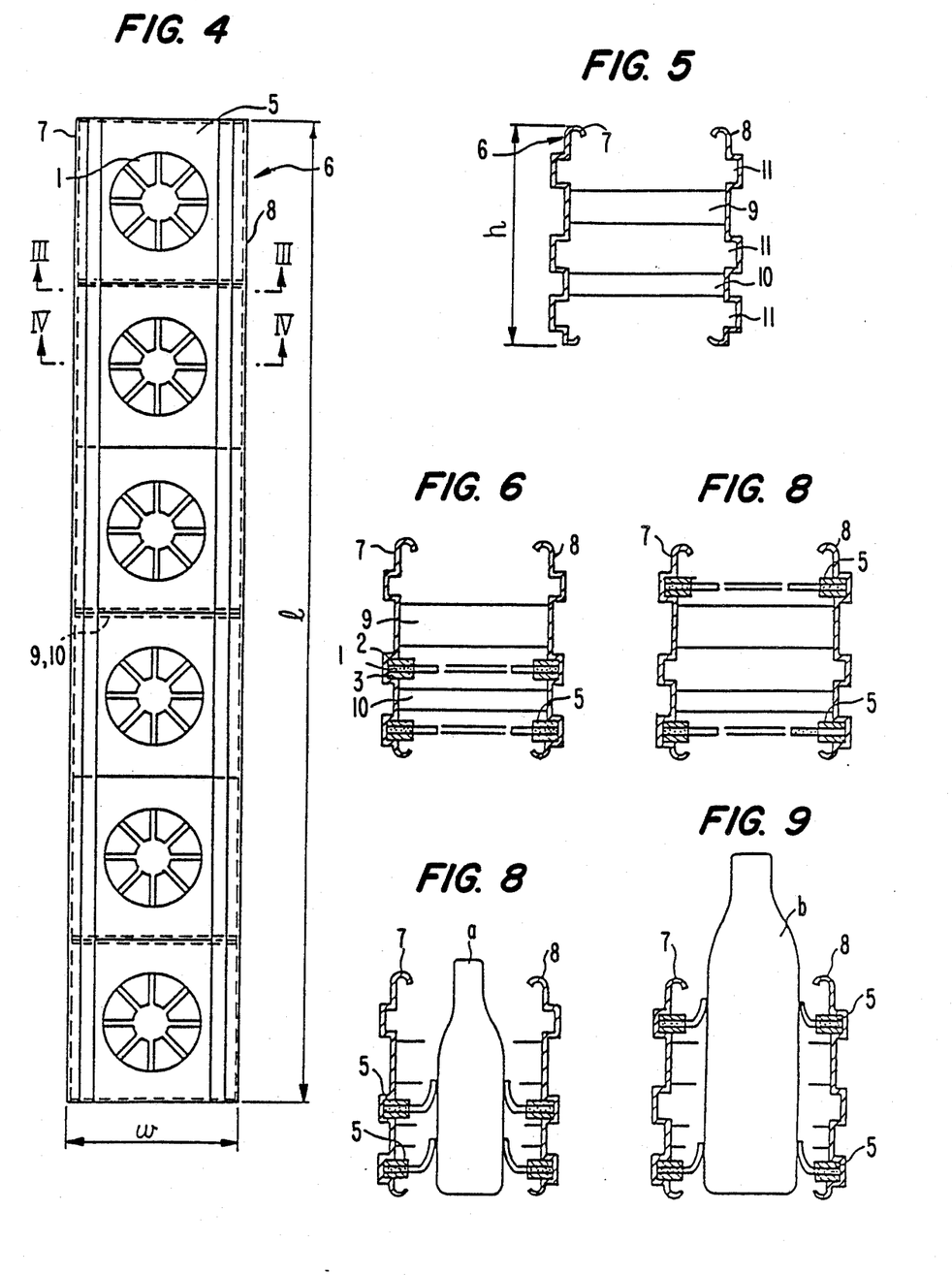
FIG. 4 is a plan view of a carrier which receives the flexible container holder shown in FIG. 1 and carries some containers as a unit.
FIG. 5 is a cross-sectional view taken on line III—III of FIG. 4.
FIG. 6 is a cross-sectional view taken on line IV—IV of FIG. 4.
FIG. 8 is a view similar to FIG. 6.
FIG. 9 is a view similar to FIG. 8, but in which a large container is retained.

Referring next to FIGS. 4 and 5, there is shown a carrier 6 in which the aforementioned holder 5 and other similar holders, indicated also by numeral 5, are mounted. In the illustrated example, six holders 5 are mounted in the carrier 6 having a desired length. The carrier 6 has side plates 7 and 8 between which plates 9 and 10 extend. The plates 9 and 10 are fastened to the side plates 7 and 8 by welding or other method to constitute a unitary structure. Each of the side plates 7 and 8 is provided with grooves 11 running longitudinally at different heights. In the illustrated example, three grooves 11 are formed in each side plate at different heights. Some holders 5 can be received in each groove 11 horizontally so as to be withdrawable. The number of the holders 5 can be determined at will according to the kind of the container employed. When a different kind of container is used, the holders 5 are replaced by holders of a different kind. At this time, it is not necessary to modify the dimensions l, w, h of the carrier 6.

Before each container a is handled, it is held and placed in the center with certainty by an upper holder 5a and a lower holder 5b, as shown in FIG. 6.

The relation of a container a to the holder 5 is now described. Referring to FIG. 1, the container a is inserted into the hole 1b in the holding member 1 from below the holder 5. Then, the container a is maintained in the condition shown in FIG. 2. At this time, the force applied to the container a to hold it can be arbitrarily set, depending on the outside diameter d of the container a, the amount of bend of the flexible holding member 1, and the length x of the straight portion. Accordingly, in the present example, the adapter 2 that cooperates with the holding member 1 can set the force with which the container is retained.

When the container having a diameter of d is handled, the inside diameter $D_1$ of the holding frame 3 and the inside diameter $D_2$ of the adapter 2 are determined as follows:

$$D_1 > d + (\text{thickness of the holding member} + \text{length } a \text{ of the gap}) \times 2$$

$$D_2 \geq d + (\text{thickness of the holding member} + \text{length } X \text{ of the straight portion}) \times 2$$

where $a \geq x$.

If necessary, the inside diameter and shape of the adapter 2 can be determined so that the rigidity of the holding member may be circularly uniform.

When a container b (FIG. 3) having an outside diameter $d_1$ larger than the outside diameter d of the container a (FIG. 2) is handled, an adapter 2a having an inside diameter $D_2'$ is used in place of the adapter 2. In this case, the holding member 1 is bent to a larger extent, and the straight portion is shortened. As a result, the holding member 1 applies a larger force to the container b to hold it. In order to accommodate larger and heavier containers, an additional holder 5 can be received in the highest groove 11 in the carrier 6 as shown in FIGS. 8 and 9.

Figures 12, 13:
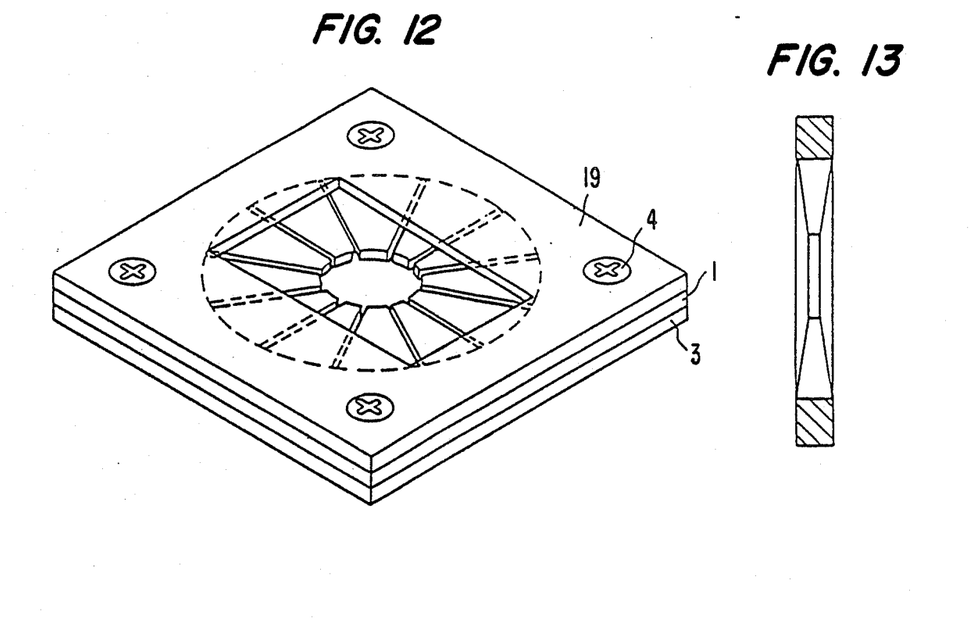
FIG. 12 is a perspective view of the flexible container holder shown in FIG. 1, and in which a rectangular bottle is held by the holder.
FIG. 13 is a cross-sectional view of a holding member.

When the container to be held is a square bottle, an adapter 19 as shown in FIG. 12 can be used.

In summary, the flexible holding member can be arbitrarily shaped according to the size of the handled container. It is essential that the holding member deform or bend freely in conformity to the container to hold and center the container. The force to retain the container is produced by deformation of the holding member, and increases or decreases according to the distance L between the front end 1a of each tongue 1a and the inner fringe of the adapter 2 (FIG. 1). Also, the length of the portion of the holding member in contact with the container automatically increases or decreases, depending on the outside diameter of the container.

The shape of the holding member can be varied in the manner described below.

(1) The thickness is varied.

(2) The number of the tongues 1a is varied.

(3) The cross section of the member is tapered off (FIG. 13).

Figure 18:
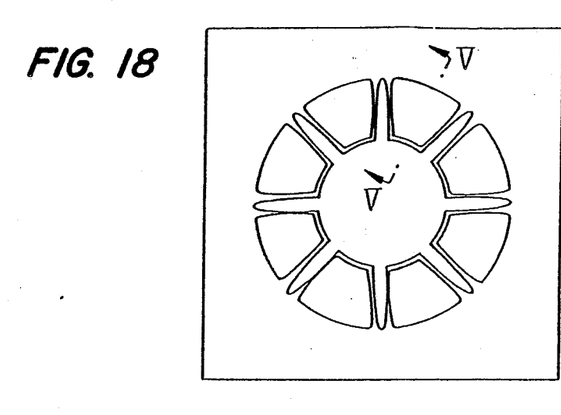
FIG. 18 is a plan view of another holding member.
Figure 19:
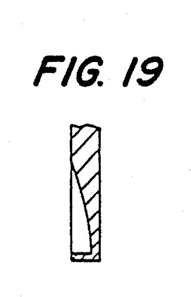
FIG. 19 is a cross-sectional view taken on line V—V of FIG. 18.

(4) The cross section is made concave to increase the force applied to the container by the bending holding member (FIGS. 18 and 19).

Figure 20:
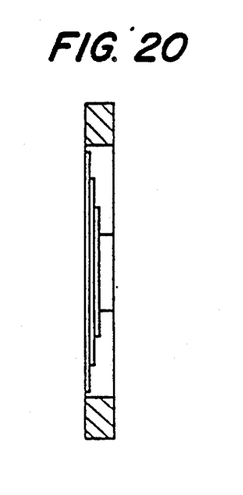
FIG. 20 is a cross-sectional view of a further holding member.

(5) The thickness is varied in a stepwise fashion in a radial direction to change the rigidity in a stepwise fashion (FIG. 20).

Figure 21:
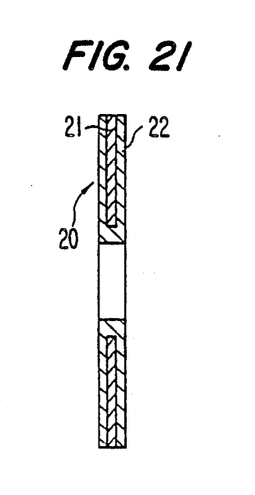
FIG. 21 is a cross-sectional view of a holding member in which a reinforcing member is inserted.

(6) As shown in FIG. 21, a holding member 20 comprises a cover member 22 in which a reinforcing member 21 is inserted.

Numerous kinds of holding members can be had by variously combining these items (1)–(6).

Figure 10:
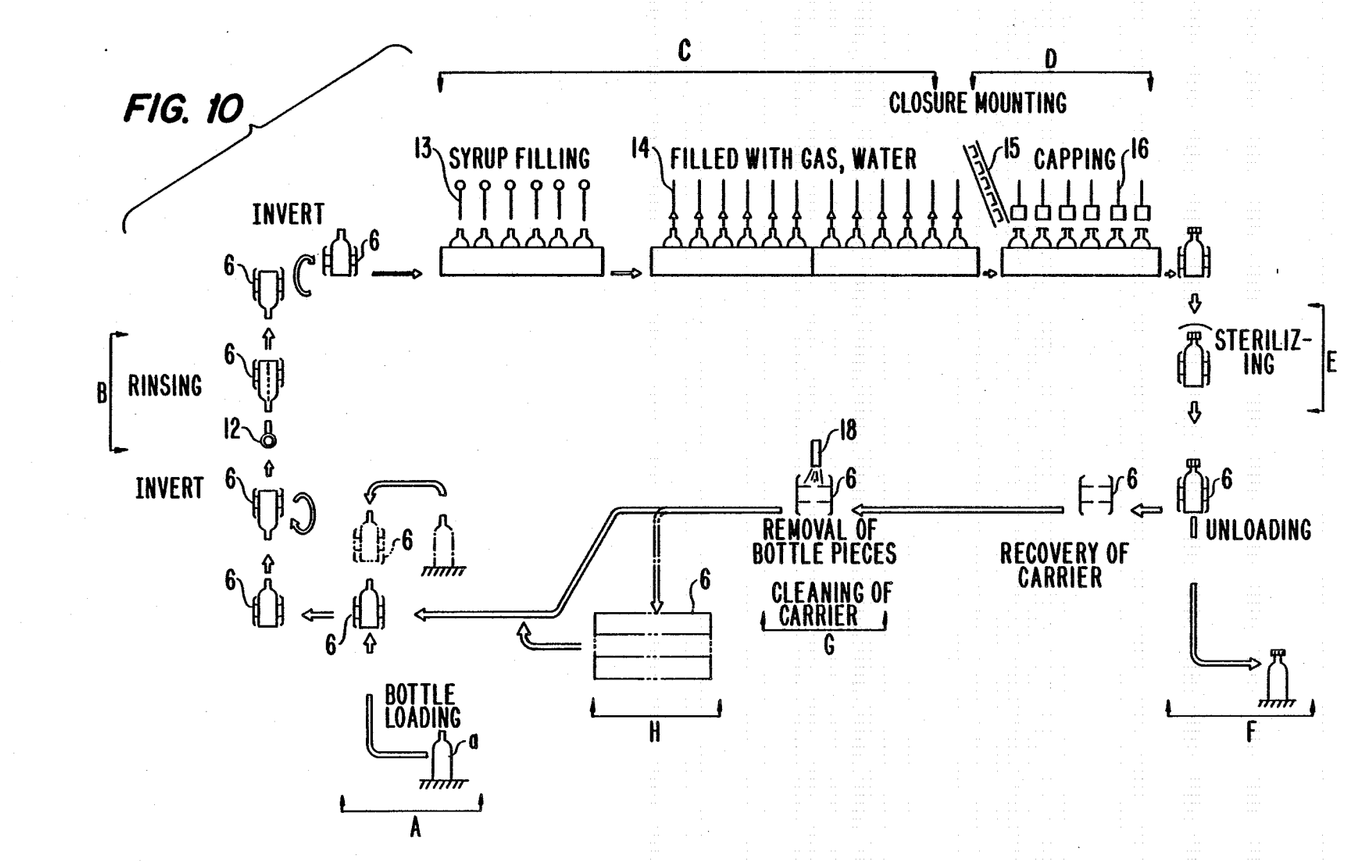
FIG. 10 is a schematic process flow diagram of a bottling system using the flexible container holder shown in FIG. 1.

Referring to FIG. 10, there is shown a bottling system making use of the holders 5 described above.

(1) During a bottle-loading process, containers are inserted into the holders 5 which are mounted in the carrier 6, and then the holders 5 are turned upside down by an inverting mechanism (not shown).

(2) During a rinsing process, water is jetted out of a cleaning nozzle 12 to clean the inside and outside of each container. Subsequently, the carrier 6 is again turned upside down by an inverting mechanism (not shown), and is conveyed for undergoing the subsequent syrup-filling process.

(3) Syrup is supplied into the containers from filling nozzles 13. Then, water in which gaseous carbonic acid may or may not be introduced is supplied into the containers from filling nozzles 14. The syrup and the water can be supplied simultaneously, or they can be supplied after they are mixed. Then, the carrier is transported for the subsequent capping process.

(4) Caps 15 are put on the mouths of the containers, and then wound and tightened by capping heads 16. Thereafter, the carrier is moved for undergoing the subsequent sterilizing process.

(5) During the sterilizing process, the liquid sealed in each container is sterilized together with the container. This process corresponds to the processes performed by the pasteurizer, bottle-warming machine, and bottle-cooling machine of the conventional system. In the present process, the whole carrier 6 is rocked or rotated to improve the efficiency of heat transfer.

(6) During an unloading process, the sterilized containers are taken out of the carrier 6 by a means (not shown). Then, the containers are carried for undergoing a casing process (not shown). The carrier 6 is conveyed to a station where pieces of broken bottles are removed. The carrier 6 is then transported to another station where it is cleaned.

(7) If any container breaks in the preceding process, the pieces of the bottle remaining in the carrier 6 are removed by cleaning the whole carrier 6 with a high-pressure jet water produced from a cleaning nozzle 18.

Carriers in which holders of different kinds are mounted are previously prepared to cope with changes in the sequence in which various kinds of containers are handled. This preparation is herein referred to as the setup of the first stage, and can be automated.

As indicated by the phantom line in FIG. 10, the container may be inserted into the holder from above during the bottle-loading process. In this case, the vertical positional relation between the holding frame and the adapter is the reverse of the relation shown in FIG. 2. Further, it is possible to insert the container into the holder from below for the loading process and to with-draw the container upwardly for the unloading process, and vice versa.

The novel flexible container holder designed as described above yields the following advantages.

(1) Where the container holder is used in a bottling or canning line, the number of steps required is minimized. Also, the time taken to change one kind of holder to another in each step is reduced to a minimum.

(2) Since several containers are carried simultaneously by a carrier, a conveyor which would heretofore been needed simply to convey containers can be dispensed with. Hence, the equipment can be made compact. Also, the equipment occupies much less space than conventional.

(3) Since the outside diameter of the carriers is fixed, when one kind of container holder is switched to another, readjustment, a trial run of the production line, and so forth are unnecessary before the operation of the production line is started.

(4) Since the setup of the first stage can be automated, as soon as the containers are withdrawn from the carrier, the next group of different containers can be mounted in the carrier.

(5) No adjustments are required in handling containers. When the containers are bottles, they do not fall down, nor does any other trouble take place. Therefore, the production line can run quite stably all day in the unattended condition.

(6) Since the equipment for handling the containers is simple, the whole equipment can be rendered germfree. This facilitates various manufacturings of products, including germfree filling.

(7) The time taken to sterilize the containers can be greatly shortened.

Figure 22:
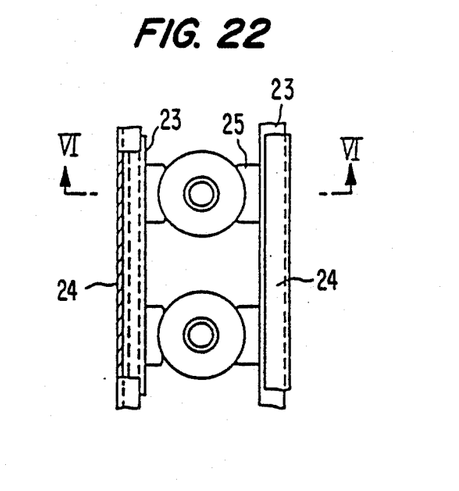
FIG. 22 is a plan view of a further carrier in which further flexible container holders are held.
Figure 23:
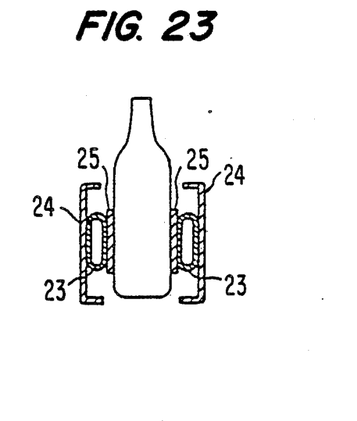
FIG. 23 is a cross-sectional view taken on line VI—VI of FIG. 22.

Referring to FIGS. 22 and 23, there are shown other container holders 25. One side of each tube 23 is fixedly secured to the longitudinally extending inner wall of the corresponding carrier 24. Each holder 25 is detachably mounted to the other side of the tube 23. The tubes 23 are made from a resilient material, such as rubber. The holders 25 are made from a material that does not damage the containers, such as Teflon TM (polytetrafluoroethylene, Du Pont Corp.) or other synthetic resin. The side of each holder 25 that makes contact with the container is so shaped as to hold it. For example, the container is shaped into an arc of a circle. The holders 25 are replaced with appropriate ones, according to the shape, size, etc, of the container. It is possible to seal air in the tubes 23.

Figure 24:
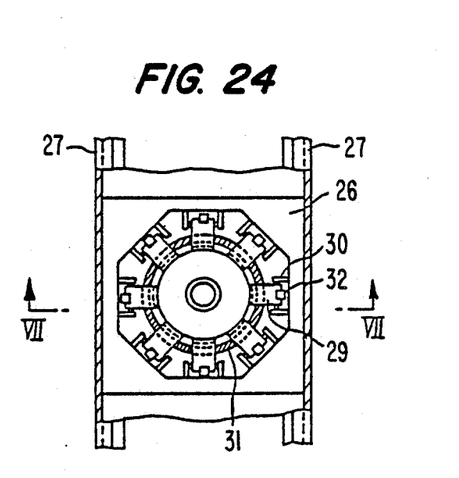
FIG. 24 is a plan view of a yet other flexible container holder.
Figure 25:
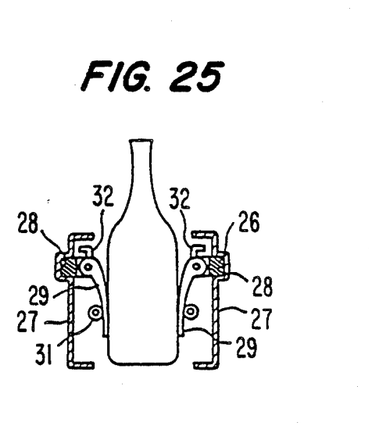
FIG. 25 is a cross-sectional view taken on line VII—VII of FIG. 24.

Referring next to FIGS. 24 and 25, there is shown a still other container holder. A carrier 27 has grooves 28 in which a support plate 26 is detachably mounted. The plate 26 rotatably supports a plurality of claws 29, eight claws in the illustrated example, on the inner side via a bracket 30. The claws 29 are made from a material that does not damage the container, such as Teflon or other synthetic resin. A tension spring 31 is mounted around the outer peripheries of the claws 29 at their lower position. Protrusions 32 extend upward from the claws 29, and can bear on the inside wall of the carrier 27 to limit the rotation of the claws 29. In this example, the support plate 26, the claws 29, and the spring 31, etc. are appropriately replaced with others, depending on the shape, size, and other factors of the container.

The manner in which each container a is handled using the holder 5 and the carrier 6 designed as described above is now described by referring to FIGS. 10 and 11. A process for loading the containers a into the carrier 6 is indicated by A. Specifically, a certain number, six in the present example, of containers a are loaded into the holder 5 and placed in position with either a known mechanism (not shown) that grasps bottles or a manipulator (not shown), the holder 5 being mounted in the carrier 6.

Figure 11:
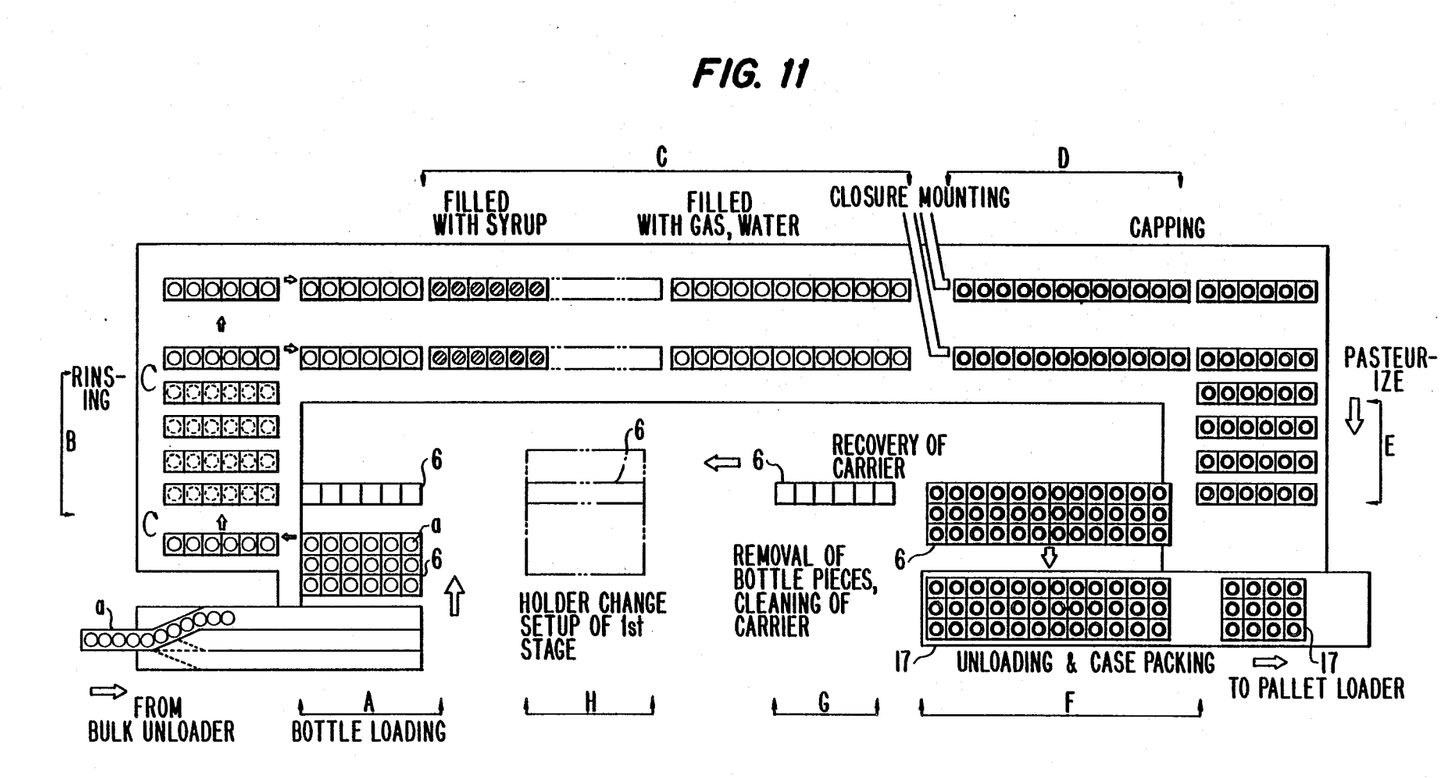
FIG. 11 is a plan view of the bottling system shown in FIG. 10.

After the containers are received in the holder 5 that is mounted in the carrier 6, the carrier is moved, together with the holder, into the next station where a cleaning process B is carried out. During this process B, the carrier 6 is inverted by an inverting mechanism (not shown). Detergent or cold or warm water is sprayed toward the inverted containers from cleaning nozzles 12 to wash the inside and outside of each container. After the containers a received in the carrier 6 undergo the cleaning process B, the carrier 6 is again inverted and conveyed to the next station where a filling process C is carried out, while the mouth of each container a is located at the top.

The filling process C is effected to fill each container a received in the carrier 6 with liquid. This station has a filling mechanism (not shown) including filling nozzles 13 and 14. In the present example, syrup and water in which gaseous carbonic acid may or may not be introduced are injected one after another into each container, but it is also possible to inject both simultaneously.

During a capping process D, a cap 15 is put on the mouth of each container and then is rotated and tightened by a capping head 16. In the illustrated example, the cap is a screw cap or roll-on cap. Where the cap is a crown cap, each container can also be handled similarly.

After the capping process is finished, the carrier 6 goes into a sterilizing process E, where the liquid sealed in the containers is sterilized together with the containers. Note that this process has been conventionally carried out by a pasteurizer, bottle-warming machine, or bottle-cooling machine. A mechanism (not shown) for rocking or rotating the whole carrier 6 is provided. The present process is not restricted to sterilization, but rather it can also be used to warm or cool bottles or cans.

During the next unloading/case packing process F, each container a received in the carrier 6 is taken out of it, and a certain number, twelve in this example, of containers a are packed into a case 17. The containers a are separated from the carrier 6, which is conveyed to the next station where a bottle piece-removing/carrier cleaning process G is carried out.

In the process G, if any bottle breaks during the preceding process, the whole carrier 6 is cleaned with high-pressure jet water sprayed from a cleaning nozzle 18 to remove the pieces of the broken bottle.

After the completion of the cleaning of the carrier 6, it is returned to the initial process, or the loading process. If the next set of containers differs in shape or dimension from the previous set of containers, all the carriers or holders 6 are replaced with ones which are prepared during a holder type change/first stage setup process H.

During the processes A through H, the carrier 6 is carried in a closed loop and repeatedly used. Depending on the kind or quality of product, the sterilizing process F may not be needed, in which case the carrier 6 can be caused to bypass the station in which the sterilizing process is carried out.

Figure 14:
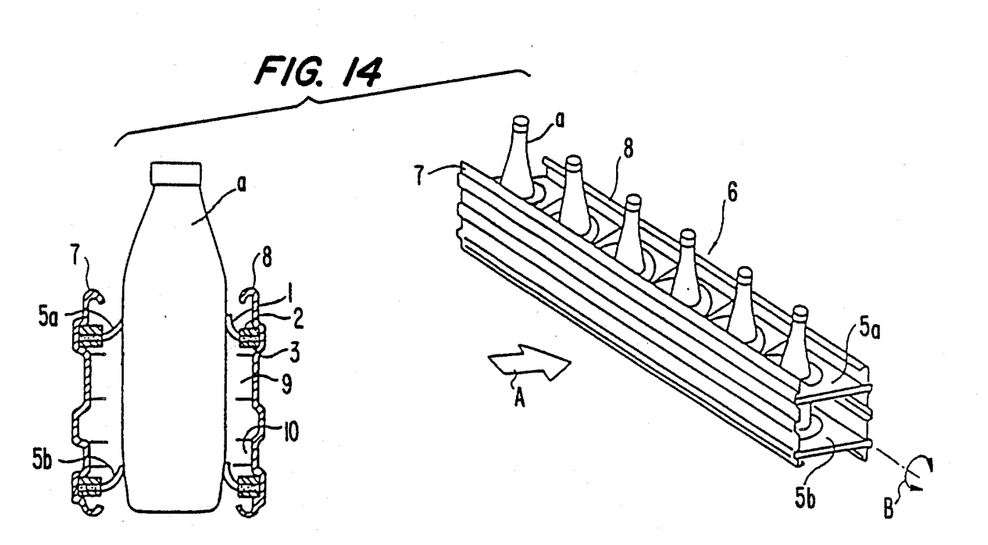
FIG. 14 is a perspective view of a carrier in which containers are received and held.

FIG. 14 is a perspective view of the aforementioned carrier 6 in which several, six in the present example, containers a are held by upper holders 5a and lower holders 5b. The carrier 6 is conveyed in the direction indicated by the arrow A while rotated as indicated by the arrow B. The carrier can be rotated either clockwise or counterclockwise as shown.

Figure 15:
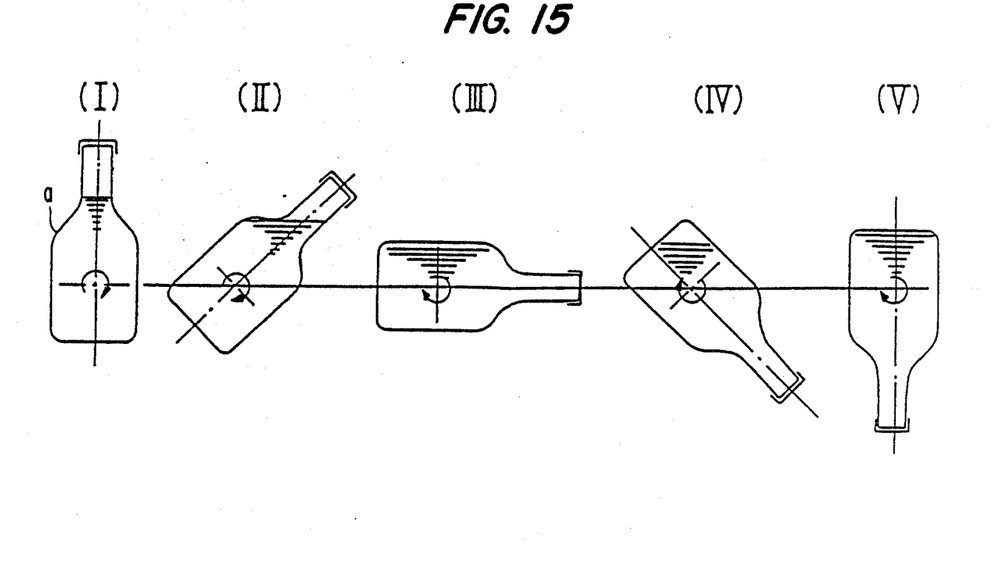

FIG. 15 shows the manner in which the container a, such as a bottle or can, is rotated. It is rotated from an upright position (I) through angular positions (II), (III), (IV) to an inverted position (V). To return the container from the inverted position (V) to the original position (I), the reverse sequence is taken or the container in the inverted position (V) is kept rotating in the same direction.

Figure 16:
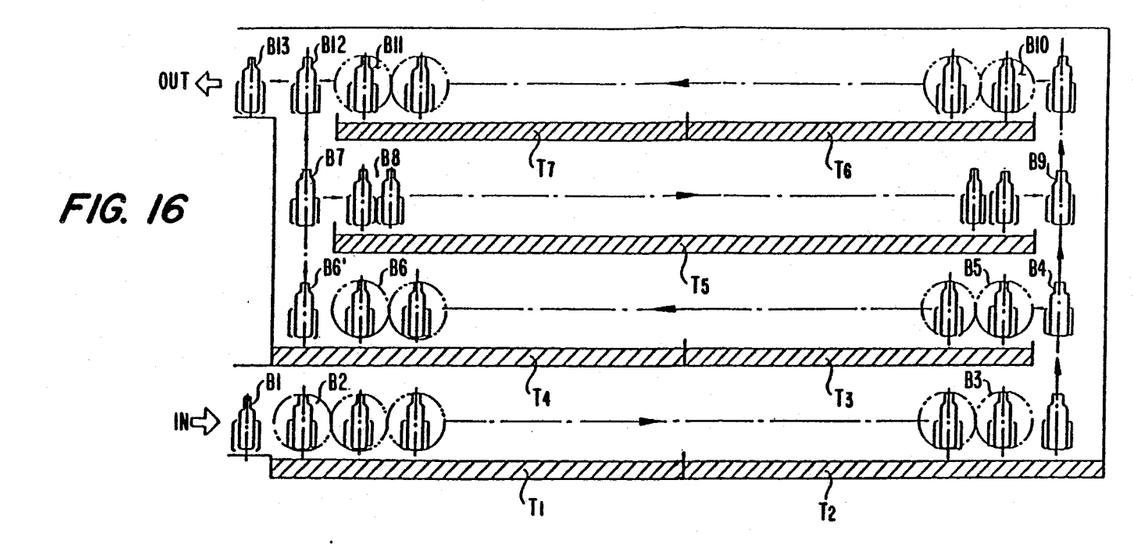
FIG. 16 is a schematic side elevation in cross section of an equipment for warming or cooling containers, such as bottles or cans.

Containers a are warmed or cooled using the aforementioned holders 5 and carrier 6 in the manner described below. FIG. 16 shows an equipment for warming or cooling the containers a. The equipment is housed in a housing, and has handling vessels $T_1$–$T_7$ which are disposed at different heights for each individual handling. Conveyance paths extend between the vessels to allow carriers 6 to move into the vessels of the desired height. The paths are designed so that the paths of different heights communicate with each other through vertical passages at the ends of the vessels. When each carrier 6 is moved, it enters a stage $B_1$, passes through stages $B_2$–$B_{12}$, and goes out of a stage $B_{13}$. The circles indicated by the phantom lines indicate that the carrier 6 is rotated by a driving device (not shown). The carrier 6 in which filled containers a are held first enters the stage $B_1$. Then, the carrier is moved into successive locations by an appropriate means (not shown) as indicated by the arrow. Within the equipment, the carrier 6 is conveyed in the direction indicated by the arrow A in FIG. 14 by a conveyance means (not shown).

After the container a holding product liquid of room temperature is heated for sterilization, it is cooled in the manner described below. In this case, the vessels $T_1$–$T_4$ act as heating vessels, each of which draws in a heating medium of a certain temperature using a pump or the like and sprays the medium against the carrier 6 that is traveling through the vessel. During this heating process, each container a is rotated by the driving device when it is moved from the stage $B_2$ to the stage $B_3$ of the lowest height and also when it is moved from the stage $B_5$ to the stage $B_6$ of the next lowest height to improve the general transfer of heat and to homogeneously heat the inside product liquid.

A holding vessel $T_5$ which is located in the third place from the bottom serves to enhance the effects of heating and sterilization. The medium which is at a certain temperature and stores heat is drawn in by a pump or the like and sprayed against the carrier 6, or the containers a, that is traveling through the vessel $T_5$ between the stages $B_7$ and $B_9$. Since the containers have been already heated sufficiently uniformly in the heating vessels $T_1$–$T_4$, it is not necessary to rotate the carrier 6 in this holding vessel $T_5$.

Cooling vessels $T_6$ and $T_7$ use pumps or the like to draw in coolant of a certain temperature. Then, the coolant is sprayed against the carrier 6, or the containers a, that is traveling through the vessel $T_6$ or $T_7$ to cool the containers. Every carrier 6 is rotated also in this stage in order to enhance the general transfer of heat and to cool the containers uniformly. The containers can be cooled below a predetermined temperature until they reach the final stage $B_{13}$.

Where the equipment shown in FIG. 16 is used simply as a bottle-warming or -cooling machine or can-warming or -cooling machine for the containers a, the equipment can be so controlled that the carriers jump from the position of the stage $B_4$ to the position of the stage $B_9$ and then to the position of the stage $B_{10}$, or that they jump from the position of a stage $B_6$, to the stage $B_7$ and then to the position of the stage $B_{12}$. In either case, the best route is selected, depending on the warming or cooling conditions or handling conditions. Thus, the time taken to handle the containers can be minimized.

Figure 17:
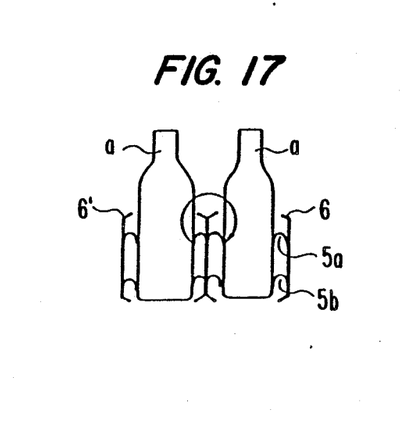
FIG. 17 is a side elevation in cross section of two carriers which are rotated together.

It is possible to form an exit (not shown) at a desired location in the housing, for removing the carrier 6 at the position, for example, of the stage $B_6'$ from the equipment. In the equipment shown in FIG. 16, the vessels are disposed in a three-dimensional manner. If necessary, they can be disposed in a plane. The number and length of the vessels and the period during which the vessels are warmed or cooled are varied, depending on the kind of bottles or cans handled or other conditions. In the equipment shown in FIG. 16, the carriers are individually turned. As shown in FIG. 17, two or more carriers 6, 6' are fastened together so that they may rotate as a unit. In this case, the space inside the equipment can be efficiently employed. Therefore, the equipment can be made compact. In the above examples, the carriers 6 can be supplied in two or more longitudinal rows.

Experiment has shown the following relations. Under the condition that the container is placed vertically and still (FIG. 15(I)), let the general heat transfer coefficient be $h_s$[Kcal/m$^2$·hr·°C.].

(1) The container shown in FIG. 15 was placed upright (I) for 30 seconds. Then, it was placed in a horizontal posture (III) for 30 seconds. These conditions were repeated. The resulting general heat transfer coefficient $h_1$[Kcal/m$^2$·hr·°C.] was given by the relationship $$h_1/h_s = 1.10$$

That is, $h_1$ was 1.10 times as large as $h_s$.

(2) The two conditions (I and III) were alternately created at intervals of 15 seconds. The obtained general heat transfer coefficient $h_2$[Kcal/m$^2$·hr·°C.] was given by $$h_2/h_s = 1.35$$

That is, $h_2$ was 1.35 times as large as $h_s$.

(3) The condition (I) in which the container a took an upright posture and the condition (V) in which it was inverted were alternately produced at intervals of 5 seconds. The obtained general heat transfer coefficient $h_3$[Kcal/m$^2$·hr·°C.] was given by $$h_3/h_s = 1.90$$

That is, $h_3$ was 1.90 times as large as $h_s$.

Thus, by rotating containers, such as bottles or cans, in this way, they can be warmed or cooled efficiently. Also, the temperature distribution inside each container can be rendered homogeneous.

When bottles or cans are rotated to enhance the heat transfer for improving the efficiency of warming or cooling, the following facts must be taken into account.

(1) If the rotational velocity is too large or small, undesirable result will be obtained. The effects of stirring of the product liquid inside a bottle or can which is caused by rotation depend on the space left above the inside liquid, the amount of the liquid, and the shape of the container.

(2) Generally, the degree of rotation depends on the shape of the bottle or can, but the maximum efficiency is obtained by repeatedly turning it upside down.

As described in detail, in one embodiment of the invention, containers such as bottles or cans are warmed or cooled while repeatedly turned upside down, so that the product liquid inside each container is stirred. As a result, the general heat transfer efficiency is approximately doubled, compared with the case where they are not rotated. Consequently, the containers can be handled in a time about half of the time heretofore required. Further, the temperature distribution of the liquid inside each container can be made homogeneous. In addition, the liquid is homogenized. Hence, good products can be obtained efficiently. Another advantage arises from the fact that the process can be carried out with an equipment that can have existing driving systems and members. This equipment is simple in structure and does not occupy large space.

What is claimed is:

1. A carrier for transporting containers comprising:
a pair of side plates in spaced opposed relation;
at least one groove in each said side plate of said pair of side plates, each said at least one groove of said one side plate being opposed to the other said at least one groove in the other said side plate, thereby comprising a pair of grooves; and
at least one flexible container holder for holding various sized containers, said flexible container holder being slidably received in said pair of grooves, said flexible container holder including a holding member having a central hole therein, said holding member having means for centering, exerting a holding force on, and releasably retaining a container, said flexible container holder including a holding frame for detachably retaining said holding member, and said flexible container holder including at least two different adaptor plates which are respectively individually detachably secured to said holding frame one at a time for releasably retaining said holding member against said holding frame, each adaptor plate of said at least two adaptor plates engaging said holding member for causing said holding member to exert a holding force on the container which is individual to the particular adaptor plate, and one of said at least two adaptor plates being interchangeable with another one of said at least two adaptor plates for effecting a different holding force of said holding member on the container.

2. The carrier of claim 1, wherein said holding member includes inwardly extending flexible tongues, said adaptor plates engage said flexible tongues at respective points, intermediate the lengths thereof, for determining the effective lengths of said flexible tongues for determining the holding force of said flexible tongues on the container.

3. The carrier of claim 1, wherein there are at least three pairs of grooves, and at least two container holders, whereby shifting said container holders to different ones of said pairs of grooves accommodates various length containers.

4. The carrier of claim 3, wherein said pairs of side plates comprise an endless conveyor.

5. An apparatus for handling various sized containers comprising:
a carrier for transporting containers, said carrier including:
a pair of side plates in spaced opposed relation; and
at least one groove in each said side plate of said pair of side plates, each said at least one groove of said one side plate being opposed to the other said at least one groove in the other said side plate, thereby comprising a pair of grooves; and
at least one flexible container holder for holding various sized containers, said flexible container holder being slidably received in said pair of grooves, said flexible container holder including a holding member having a central hole therein, said holding member having means for centering, exerting a holding force on, and releasably retaining a container, said flexible container holder including a holding frame for detachably retaining said holding member, and said flexible container holder including at least two different adaptor plates which are respectively individually detachably secured to said holding frame one at a time for releasably retaining said holding member against said holding frame, each adaptor plate of said at least two adaptor plates engaging said holding member for causing said holding member to exert a holding force on the container which is individual to the particular adaptor plate, and one of said at least two adaptor plates being interchangeable with another one of said at least two adaptor plates for effecting a different holding force of said holding member on the container; and
at least one apparatus being connected to said carrier, said at least one apparatus being selected from the group of apparatuses consisting of means for casing, uncasing, cleaning, filling, capping, sealing, and sterilizing containers held by said carrier holder.

6. The apparatus of claim 5, wherein at least one groove is provided in each said side plate of said pair of side plates, each said at least one groove of said one side plate being opposed to the other said at least one groove in the other said side plate, thereby comprising a pair of grooves; and
said at least one container holder detachably held by said side plates is slidably received in said pair of grooves.

7. The apparatus of claim 6, wherein there are at least three pairs of grooves and at least two container holders, whereby shifting said container holders to different ones of said pairs of grooves accommodates various length containers.

8. The apparatus of claim 6, wherein said pairs of side plates comprise an endless conveyor.

9. An apparatus for changing the temperature of containers, said apparatus comprising:
a carrier for transporting containers, said carrier including:
a pair of side plates in spaced opposed relation;
at least one groove in each said side plate of said pair of side plates, each said at least one groove of said one side plate being opposed to the other said at least one groove in the other said side plate, thereby comprising a pair of grooves; and at least one flexible container holder for holding various sized containers, said flexible container holder being slidably received in said pair of grooves, said flexible container holder including a holding member having a central hole therein, said holding member having means for centering, exerting a holding force on, and releasably retaining a container, said flexible container holder including a holding frame for detachably retaining said holding member, and said flexible container holder including at least two different adaptor plates which are respectively individually detachably secured to said holding frame one at a time for releasably retaining said holding member against said holding frame, each adaptor plate of said at least two adaptor plates engaging said holding member for causing said holding member to exert a holding force on the container which is individual to the particular adaptor plate, and one of said at least two adaptor plates being interchangeable with another one of said at least two adaptor plates for effecting a different holding force of said holding member on the container;

means for repeatedly turning said carrier, whereby a container which is held by said container holder is repeatedly turned; and means connected to said carrier for changing the temperature of the containers as the containers are repeatedly turned by said turning means.

10. The apparatus of claim 9, wherein the means for changing temperature of the containers comprises means for spraying fluid on the containers.

* * * * *